Jan. 21, 1958  A. Y. DODGE  2,820,373
HYDRAULIC TORQUE CONVERTER
Filed May 21, 1953  2 Sheets-Sheet 1
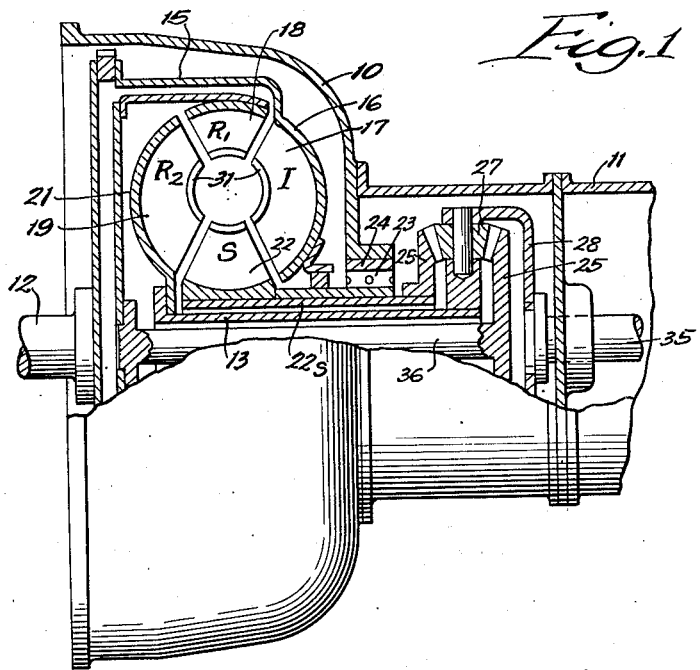
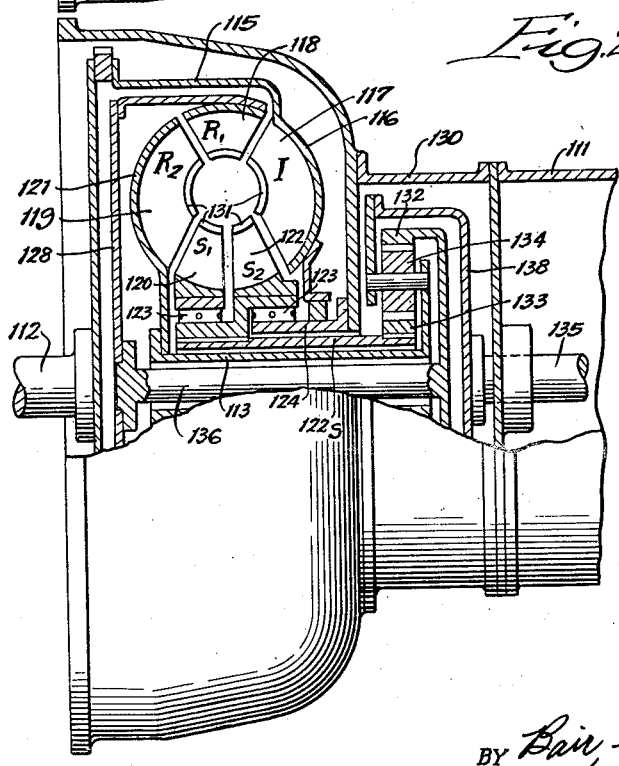
INVENTOR:
Adiel Y. Dodge,
BY Bair, Freeman & Molinare
ATTORNEYS.

Jan. 21, 1958  A. Y. DODGE  2,820,373
HYDRAULIC TORQUE CONVERTER
Filed May 21, 1953  2 Sheets-Sheet 2
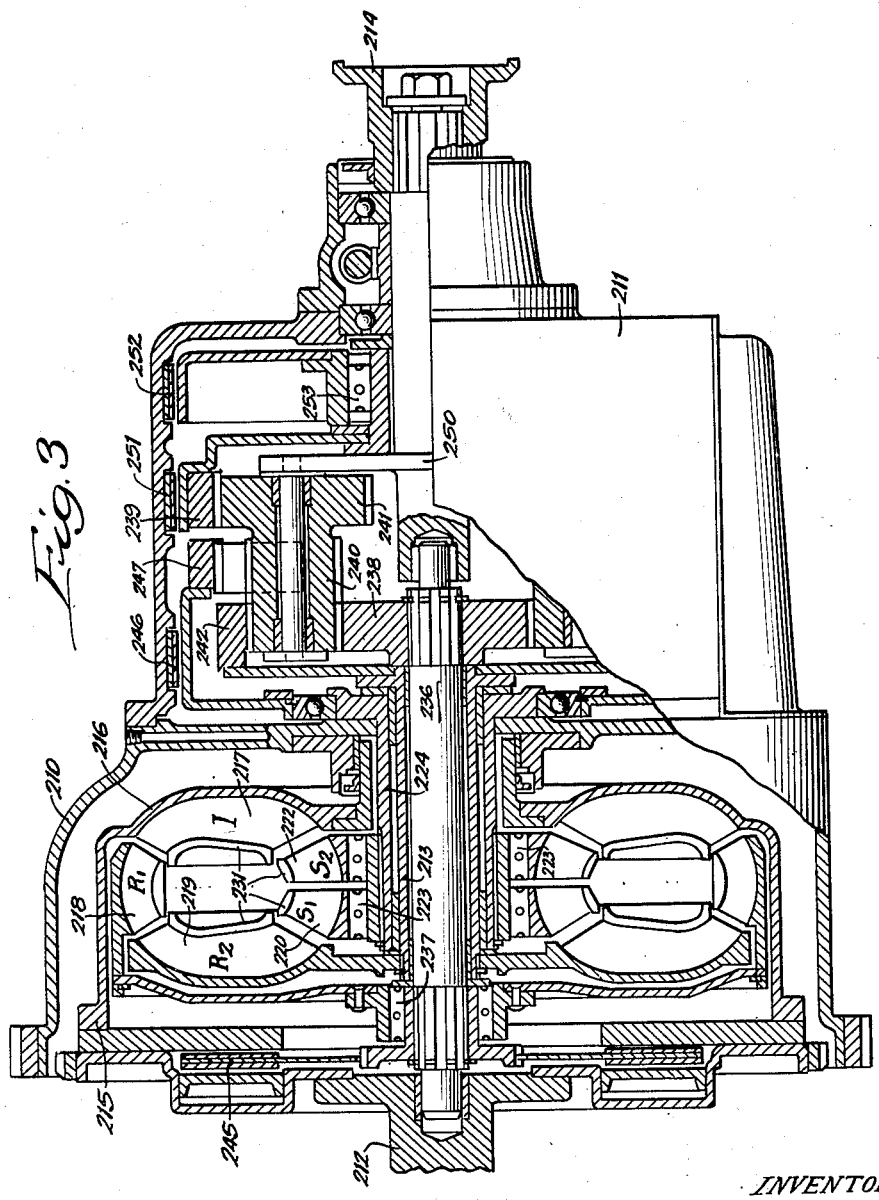
INVENTOR:
Adiel Y. Dodge,
BY Bair, Freeman & Molinare
ATTORNEYS.

United States Patent Office
2,820,373
Patented Jan. 21, 1958

2,820,373

HYDRAULIC TORQUE CONVERTER

Adiel Y. Dodge, Rockford, Ill.

Application May 21, 1953, Serial No. 356,436

8 Claims. (Cl. 74—677)

This invention relates to hydraulic torque converters and more particularly to a hydraulic infinitely variable torque multiplying unit of the type adapted for use in automotive vehicles.

Hydraulic torque converters have been used for many years to transmit torque from the engine to the driving wheels of automotive vehicles. One of the principal difficulties encountered in the use of such units is in the efficiency of operation, particularly at the start or under running conditions requiring high torque multiplication.

One of the difficulties with transmissions of this type is the fact that, since the effect of the vanes on the liquid is the resultant of the effect of the vane angle and of the speed of rotation of the vanes, the effect is different at different speeds, and the correct vane angle for one speed is not the correct angle at another speed. If it is elected to use vane angles suitable for speeds approaching 1:1 ratio to obtain high efficiency under such conditions, then it is advisable to do something to reduce fluid shock and minimize efficiency losses occurring at large differences in speed ratio.

It is pointed out at this time that this invention is a step forward in a long series of progressive improvements. It has been proposed to reduce the fluid shock due to large differences in speed by use of pivoted vanes, such as set forth in my Patents 2,235,673 and 2,190,830. It has also been proposed to use turbine wheels built in sections to turn separately, such as set forth in my Patent 2,173,604. The present application shows another and in many ways better solution of an old problem.

In my Patent No. 2,235,672, I have proposed the use of an auxiliary vaned rotor or turbine element between the outlet of the impeller or pump vanes and the inlet of the main driven rotor or turbine vanes which is so connected to the other elements that it will turn at speeds between the speeds of the driving and driven members. Such an auxiliary rotor can be employed to increase the starting torque, and will also smooth out the flow of fluid between the driving and driven members where the most abrupt change normally occurs.

The present invention relates to a hydraulic torque converter generally similar to that of my above mentioned Patent 2,235,672 and has for one of its objects simplification of the construction over that shown in the patent and improved control of the speed of the auxiliary rotor.

Another object is to provide a hydraulic torque converter in which the speed of the auxiliary rotor is controlled by connecting it through differential gearing to the stator and/or other fixed members.

According to one feature of the invention, the stator is formed by a plurality of separately rotatable rings and the differential gearing is connected to the ring closest to the pump inlet. This feature retains the major benefits of multiple ring stators while extending the torque range of the converter to higher speeds than those obtained with conventional constructions.

A further object is to provide a hydraulic torque converter in which the gearing connecting the auxiliary rotor to the other members may be of small size for compactness and cost savings and can provide substantially any desired gear ratio. This gearing is preferably located in a gear box separate from the converter for ease of lubrication.

A still further object of this invention is to provide means for utilizing planetary gears located externally of the turbo housing to transmit torque from an auxiliary impeller to the output shaft at an increase in torque and to control the speed of the auxiliary impeller so that it turns at a speed lying between the speed of the pump wheel and that of the main turbine and approaching the speed of the pump wheel as the speed of the main turbine approaches the speed of the pump wheel.

The above and other objects and features of the invention will be more readily apparent from the following description when read in connection with the accompanying drawing in which:

Figures 1, 2, and 3 show sections with parts in elevation, of alternate forms of torque converters and gears to go therewith embodying this invention.

The torque converter of Figure 1 comprises an outer fixed casing 10 which may be a transmission housing and which may support a gear casing 11 containing gearing for changing the driving ratios and for producing reverse drive. The torque converter is adapted to connect an input shaft 12, which may be the crankshaft of an engine, or an extension thereof, to a driven shaft 13 which transmits the torque into the gear set. A final output shaft (not shown) from the gear set in casing 11 may be connected through the usual differential to the driving wheels of a vehicle.

The torque converter itself comprises a housing 15 secured to the driving shaft and to be driven thereby and which is formed with an inwardly curved wall 16 carrying a set of pump or impeller vanes 17. The pump vanes extend generally radially and will produce an outward toroidal flow of liquid in the circuit.

Adjacent to the outlet of the pump vanes there is arranged an auxiliary rotor, including a set of vanes 18 in alinement with the vanes 17. Discharge from the auxiliary rotor vanes 18 is into a set of rotor vanes 19 carried by a shell 21 which is secured directly to a driven shaft 13.

A stator 22 is mounted between the outlet of the main rotor vanes 19 and the inlet of the pump vanes 17. The stator 22 is carried on a sleeve 22S which is held against rotation in one direction by a one-way brake 23 which is supported on a flange 24 fixed to the housing 10.

The one-way brake 23 is set to permit forward rotation of the stator in the same direction as the driving shaft 12, but to prevent reverse rotation.

The auxiliary rotor is connected through a differential gear set to the stator and to the driven member of the torque converter. The speed of the rotor 18 will be intermediate the speeds of the driving and driven members under most conditions. As shown in Figure 1, the differential gearing comprises a pair of bevel face gears 25, one of which is secured directly to the stator shaft 22S and the other of which is secured directly to the rotor 18 through a shaft 36. Planet pinions 27 mesh with the face gears 25 and are carried by a shell 28 which is secured to the main rotor 19 and to an input shaft 35 for the gear unit in casing 11.

In this construction, when the driving shaft is turning, fluid will be circulated radially outward over the vanes 17 in a toroidal circuit through the auxiliary rotor $R_1$, the main rotor $R_2$ and the stator S. At relatively low speeds and high torques, liquid discharged from the impeller vanes 17 will act first on the auxiliary rotor vanes and will tend to turn said auxiliary rotor forward. If the load is such to hold the driven shaft stationary, the auxiliary rotor and the main rotor will be virtually stalled. But when the shaft 35 starts to turn under these conditions, rotor 18 turns forwardly driving the differential gear at a speed lying between the speed of the driving shaft and the main rotor 19. With face gears of equal sizes as shown, the speed of the auxiliary rotor will be twice that of the driven shaft 35 so long as the stator 22 is stalled. It will be apparent that the gearing could be varied as desired to alter this relationship of speed.

Since the auxiliary rotor vanes are turning, fluid will pass into them from the pump with substantially less shock than if they were stationary and because their speed is less than the impeller speed, the fluid will pass from the auxiliary vanes into the main rotor vanes with less shock. A higher degree of efficiency is therefore obtained through the fluid so that the torque converter can pick up the load more effectively and efficiently. As the main driven rotor starts to turn, the speed of the auxiliary rotor will be maintained at a speed between that of the impeller and of the main driven rotor at all times. Smooth flow of liquid is therefore maintained with a minimum of shock and with resultant high operating efficiencies. When the speed of 1:1 is reached, the auxiliary and main driven rotor will turn at nearly the same speed approaching that of the impeller and the stator will overrun on the one-way brake 23, as is understood.

In the construction of Figure 2, parts corresponding to identical parts in Figure 1 have been indicated by the same reference numerals, plus 100. In this construction, the stator is divided into a pair of stator rings 120 and 122 with the stator ring 120 lying adjacent to the outlet of the main rotor ring 119 and the ring 122 lying adjacent to the inlet of the impeller vanes. The stator rings are supported and held against reverse rotation by separate one-way brakes 123.

All of the vanes of the several vaned elements carry annular core sections 131 which together form an annular core in the center of the toroidal circuit formed by the vaned elements. The auxiliary rotor 118 drives an annular internal ring gear 132 which is located in a separate casing 130 outside of the torque converter torous and the second stator ring 122 drives an external annular sun gear 133 lying within the ring gear 132. The main rotor 119 is connected to a series of pinions 134 meshing with the annular gears 132 and 133 to form therewith a planetary differential gear set. The pinions 134 are carried by a carrier 138 connected to the input shaft 135 of the gear set in casing 111.

In operation of this unit, when the rotor shaft 113 is stalled, both rotors $R_1$ and $R_2$ will remain stationary and both stator rings $S_1$ and $S_2$ will rest against their one-way brakes 123. As the speed of the impeller I is increased, the force of the fluid impinging against the auxiliary rotary vanes 118 will become sufficient to turn the auxiliary rotor $R_1$ forward. The auxiliary rotor $R_1$ will tend to help drive the main rotor $R_2$ through the differential gearing and this force will be added to the driving force of the fluid impinging on the main rotor vanes 119. However, the differential gearing effects a torque multiplication between the auxiliary rotor $R_1$ and the main rotor $R_2$ so that torque of the auxiliary rotor $R_1$ is multiplied and added to the main rotor $R_2$ torque and will serve to pick up the load and turn the driven shaft 135. Thereby the stall torque of the torque converter is increased and it will start to drive the load at a lower input torque than is the case with a conventional torque converter. At the same time, the speed of the auxiliary rotor $R_1$ will be at a value between the impeller I speed and the main rotor $R_2$ speed so that the fluid can flow with a reduced shock, as contrasted to a single rotor converter.

As the speed increases, liquid discharged from the first stator ring 120 will strike the backs of the vanes on the stator ring 122 and will tend to drive this stator forward. The reaction torque through the differential gear set will, however, prevent the stator ring 122 from turning forward until the fluid turning force becomes quite substantial. Gear 133 will be an effective fulcrum until a higher speed, lower torque driving condition is reached. At a higher speed and lower torque, while the stator ring 122 is still held against turning by the torque reaction through the gear set, the fluid may strike the back of the vanes of stator ring 120 and drive the stator ring 120 forwardly. Forward rotation of the stator ring 120 will minimize shock at the stator entrance as the fluid travels in the circuit, thus maintaining operating efficiency at a relatively high value.

At still higher speeds and lower torques, the fluid pressure against the back sides of the vanes on stator ring 122 will become sufficient to turn this ring forward. At this time, the main and auxiliary rotors $R_1$ and $R_2$ will be turning forward at more nearly the same speed and both of the stator rings $S_1$ and $S_2$ will be turning forward to produce approximately a one to one drive.

In the construction of Figure 3, parts corresponding to similar parts in Figure 1 have been indicated by the same numerals, plus 200. In this construction, the gear reactionary member 239 is entirely remote and divorced from the stators. In fact, it forms a part of the gears which replace the more or less usual planetary gears employed with torque converters. In this figure, reverse gear is 247, the low speed gear is 239 and the gears 238, 240 and 242 comprise both the two path power flow gears and the gears which transmit torque from auxiliary rotor 218 to the rotor sleeve shaft 213 and are also the planetary gears which perform the other functions mentioned above. Gear 239 is normally held against reverse rotation by a one way brake 253 controlled by a brake 252 and may be held against rotation in either direction by a brake 251. Reverse gear 247 may be held against rotation for reverse drive by a brake 246.

Like the two previous embodiments, in this embodiment, the first rotor 218 revolves faster than the second rotor 219 at the start. The two rotors 218 and 219 gradually seek the same speed. At the start, 218 drives the sun shaft 236 through one-way clutch 237 which drives the sun gear 238. During this time, the low speed ring gear 239 acts as a reactionary member so that mechanical torque increase is secured by the gears, namely planet gears 240, planet gear 241 and ring 239. However, at the same time, ring gear 242 turns forwardly due to the mechanical ratio provided and is being turned forward by 219 at a lower rate of speed than that which 218 is turning. Under certain load conditions, ring gear 242 and sun gear 238 approach the same speed of revolution.

At some desired load—speed combination, mechanical clutch 245 may be engaged, after which sun gear 238 is driven mechanically by the engine. Ring gear 242 is driven by 219. Rotor 218 is free to run idly at speeds lower than the speed of shaft 212 due to one way clutch 237, thus providing two paths of power flow. In this way, we have a torque converter gear arrangement in which high mechanical torque ratio is secured at the start, to wit: sun gear 238 is driven by 218. Ring gear 242 is driven by 219 while ring gear 239 acts as the reactionary member. Ratios automatically change without the shifting of any clutches due to hydraulic changes; i. e. after ring gear 239 turns by overrunning one way brake 253 no mechanical torque increase is provided. However, a hydraulic torque multiplication is secured while the hydraulic stators $S_1$ and $S_2$ act as the only reaction members during which time the above parts are driven in a manner described except that ring gear 239 precesses forwardly since there ceases to be a reactionary load thereon.

As indicated above, at some higher speed, the clutch 245 may be engaged, changing the driving conditions into two path power flow, at which time sun 238 is driven by the engine, ring gear 242 is driven by 219 while 218 may or may not help drive the sun shaft 236, depending upon load and speed conditions. At any rate 218 cannot overrun 219 due to one-way clutch 237.

It is pointed out that hydraulic torque is present and available during part of the two path power flow range at moderately high speeds, later fading into a 1:1 torque ratio after both of the stators S₁ and S₂ start to revolve.

Reverse movements are secured by engaging the reverse band 246 to hold the reverse ring gear 247, during which 218 drives sun gear 238. Sun gear 238 meshes with a reverse idler which in turn meshes with ring gear 247 thus driving the cage 250 in a reverse direction. The cage is fastened to output shaft 214.

Band 252 is normally engaged; one-way brake 253 permits ring gear 239 to overrun forwardly only. Brake band 251 is normally disengaged but may be engaged in order to provide a low gear for descending hills.

Band 246 is normally disengaged but is to be engaged in order to secure reverse movements, at which time bands 251 and 252 must be disengaged.

Band 251 is employed to engage low ring gear 239. This band is to provide a reduced speed ratio for descending hills since engaging band 252 would permit ring gear to overrun due to one-way brake 253.

Band 252 is normally engaged to hold reaction torque, one-way brake 253 automatically permits overrunning when reaction diminishes below zero.

It is to be noted that a wide range of driving conditions is secured with a relatively small number of gears simply arranged, and further, the gears are located in a separate casing where they may be lubricated by vapor or splash means thereby avoiding fluid noises and inefficiencies inherent to churning in a body of oil.

While three embodiments of the invention have been shown and described herein, it will be understood that they are illustrative only and not to be taken as a definition of the scope of the invention, reference being had for this purpose to the appended claims.

What is claimed is:

1. A hydraulic torque converter comprising a vaned driving rotor, a main vaned driven rotor, an auxiliary vaned rotor between the outlet of the driving rotor and the inlet of the driven rotor, a stator between the outlet of the driven rotor and the inlet of the driving rotor, a one way brake to hold the stator against reverse rotation, a differential gear set including a plurality of relatively rotatable elements interconnected with each other through gearing, a connection between the auxiliary rotor and one of the elements, a connection between the driven rotor and a second of the elements, an output shaft connected to a third of the elements, and brake means to hold a fourth of the elements against rotation in a reverse direction, the first named connection including a one way clutch through which the auxiliary rotor drives said one of the elements in a forward direction, and a clutch to connect the driving rotor to said one of the elements.

2. A hydraulic torque converter comprising a vaned driving rotor, a main vaned driven rotor, an auxiliary vaned rotor between the outlet of the driving rotor and the inlet of the driven rotor, a stator between the outlet of the driven rotor and the inlet of the driving rotor, a one way brake to hold the stator against reverse rotation, a differential gear set including sun and ring gears, a planet carrier connected to the driven shaft, pinions on the carrier meshing with the sun and ring gears, a connection from the auxiliary rotor to one of the gears, a connection from the driven rotor to the other of the gears, a third gear meshing with the pinions, means including a one way brake to hold the third gear against rotation to provide a fulcrum for torque multiplication, and means including a clutch to connect the driving rotor to the sun gear.

3. A hydraulic torque converter transmission to connect a driving shaft to a driven shaft comprising a vaned driving rotor connected to the driving shaft, a vaned auxiliary rotor receiving liquid from the driving rotor, a vaned main rotor receiving liquid from the auxiliary rotor, a vaned stator receiving liquid from the main rotor, a compound differential gear set including a sun gear, means connecting the sun gear to the auxiliary rotor, a first ring gear connected to the main driven rotor, a reaction gear, compound pinions meshing with the sun gear, the ring gear and the reaction gear, a carrier for the pinions connected to the driven shaft, brake means to hold the reaction gear against rotation to provide a fulcrum for torque multiplication and means including a controllable clutch to connect the driving shaft to the sun gear to provide two parallel paths of power flow.

4. A hydraulic torque converter comprising a vaned driving rotor, a vaned driven rotor, an auxiliary vaned rotor between the outlet of the driving rotor and the inlet of the driven rotor, a stator between the outlet of the driven rotor and the inlet of the driving rotor, a differential gear set including a plurality of relatively rotatable elements interconnected with each other through gearing, an output shaft connected to one of the elements, a connection between the driven rotor and a second of the elements, means including a one way brake to hold a third of the elements against reverse rotation, a connection between the auxiliary rotor and a fourth of the elements, and a clutch to connect the driving rotor to said fourth of the elements to establish two paths of power flow between the driving rotor and the output shaft.

5. A hydraulic torque converter comprising a vaned driving rotor, a vaned driven rotor, an auxiliary vaned rotor between the outlet of the driving rotor and the inlet of the driven rotor, a stator between the outlet of the driven rotor and the inlet of the driving rotor, a differential gear set including a plurality of relatively rotatable elements interconnected with each other through gearing, an output shaft connected to one of the elements, a connection between the driven rotor and a second of the elements, means including a one way brake to hold a third of the elements against reverse rotation, a one way clutch connecting the auxiliary rotor to a fourth of the elements through which the rotor can drive the element forward, and a clutch to connect the driving rotor to said fourth of the elements.

6. A hydraulic torque converter comprising a vaned driving rotor, a main vaned driven rotor, an auxiliary vaned rotor between the outlet of the driving rotor and the inlet of the driven rotor, a stator between the outlet of the driven rotor and the inlet of the driving rotor, a one way brake to hold the stator against reverse rotation, a differential gear set including three gears, a planet carrier adapted for connection to a load, pinions on the carrier meshing with all three of the gears, connections from the driven and auxiliary rotors to two of the gears respectively, each of said two of the gears tending to drive the other in a reverse direction through the pinions when rotation of the carrier is resisted a one way clutch and a releasable brake in series connected to the third of the gears to hold it against reverse rotation, and a second releasable brake connected to the third of the gears to hold it against rotation in either direction.

7. A hydraulic torque converter comprising a vaned driving rotor, a main vaned driven rotor, an auxiliary vaned rotor between the outlet of the driving rotor and the inlet of the driven rotor, a stator between the outlet of the driven rotor and the inlet of the driving rotor, a one way brake to hold the stator against reverse rotation, a differential gear set including three gears, a planet carrier connected to the driven shaft, pinions on the carrier meshing with the gears, connections from the driven and auxiliary rotors to two of the gears respectively, brake means to hold the third of the gears against reverse rotation to provide a low gear forward drive, a reverse gear meshing with the pinions, brake means to hold the reverse gear against rotation to produce reverse drive through the gearing, and a mechanical clutch to connect the driving rotor to one of said two of the gears thereby to provide a positive mechanical drive when one of said brake means is engaged.

8. A hydraulic torque converter comprising a vaned driving rotor, a main vaned driven rotor, an auxiliary vaned rotor between the outlet of the driving rotor and the inlet of the driven rotor, a stator between the outlet of the driven rotor and the inlet of the driving rotor, a one way brake to hold the stator against reverse rotation, a differential gear set including a plurality of relatively rotatable elements interconnected with each other through gearing, a connection between the auxiliary rotor and one of the elements, a connection between the driven rotor and a second of the elements, an output shaft connected to a third of the elements, a mechanical brake to hold a fourth element of the gear set against rotation in either direction, the first named connection including a one way clutch through which the auxiliary rotor drives said one of the elements in a forward direction, and a clutch to connect the driving rotor to said one of the elements.

References Cited in the file of this patent

UNITED STATES PATENTS

| | | |
|---|---|---|
| 2,203,177 | Patterson | June 4, 1940 |
| 2,293,358 | Pollard | Aug. 18, 1942 |
| 2,298,648 | Russell | Oct. 13, 1942 |
| 2,312,849 | Pollard | Mar. 2, 1943 |
| 2,334,394 | Dodge | Nov. 16, 1943 |
| 2,385,058 | Buthe | Sept. 18, 1945 |
| 2,568,007 | Jandasek | Sept. 18, 1951 |
| 2,578,450 | Pollard | Dec. 11, 1951 |
| 2,591,342 | Dodge | Apr. 1, 1952 |
| 2,606,460 | Kelley | Aug. 12, 1952 |
| 2,609,708 | Burnett | Sept. 9, 1952 |
| 2,616,309 | Russell | Nov. 4, 1952 |
| 2,623,411 | Herndon | Dec. 30, 1952 |
| 2,737,827 | Seybold | Mar. 13, 1956 |

FOREIGN PATENTS

| | | |
|---|---|---|
| 666,092 | Great Britain | Feb. 6, 1952 |